Patented Dec. 9, 1952

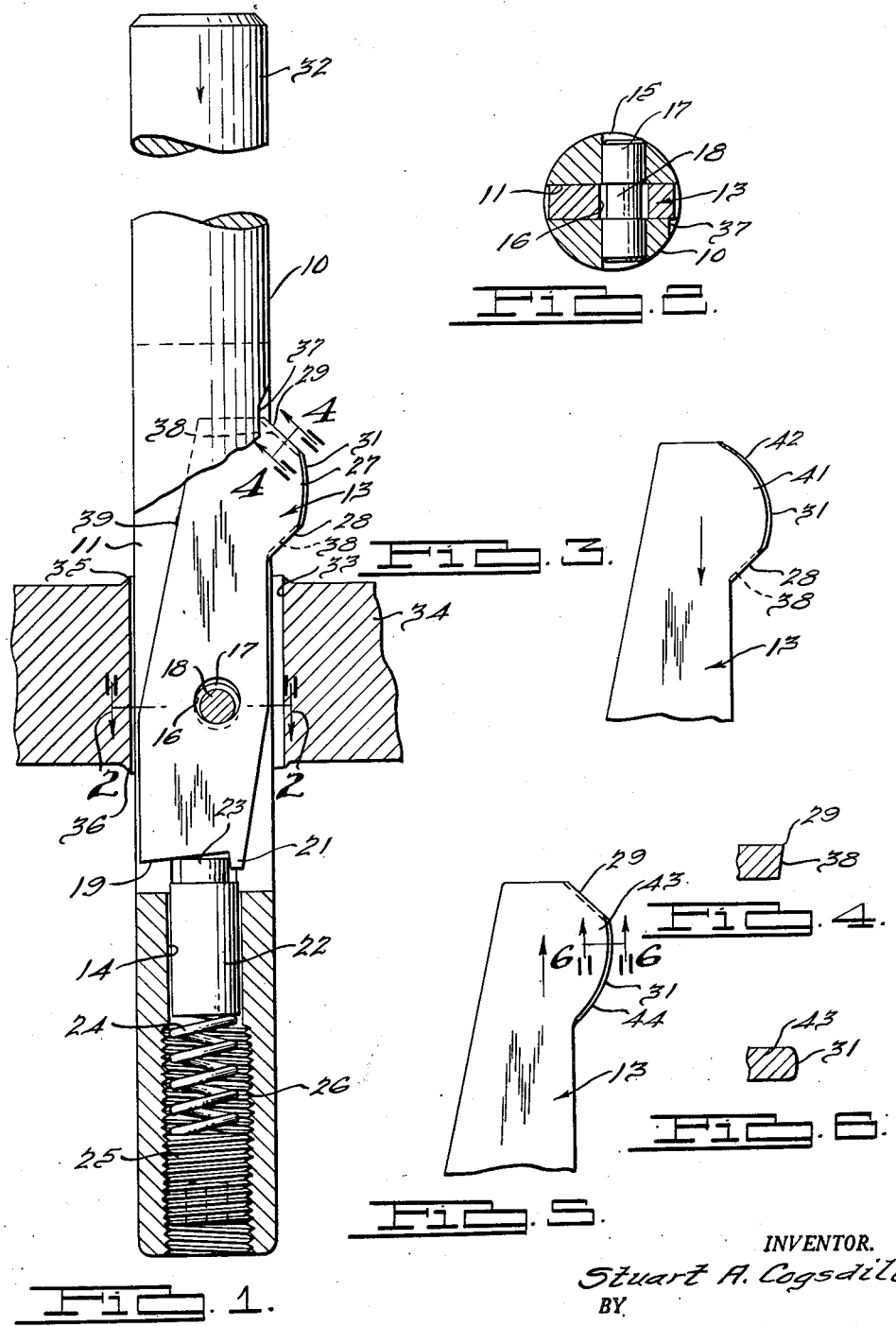
Dec. 9, 1952  S. A. COGSDILL  2,620,689
DEBURRING TOOL HAVING A SLENDER BODY
FOR PROJECTING INTO AN APERTURE
Filed Feb. 18, 1950
INVENTOR.
Stuart A. Cogsdill.
BY
Harness, Dickey & Pierce
ATTORNEYS.

2,620,689

UNITED STATES PATENT OFFICE 2,620,689

DEBURRING TOOL HAVING A SLENDER BODY FOR PROJECTING INTO AN APERTURE

Stuart A. Cogsdill, Detroit, Mich., assignor to Cogsdill Twist Drill Company, Inc., Detroit, Mich., a corporation of Michigan Application February 18, 1950, Serial No. 145,074

11 Claims. (Cl. 77—73.5)

This invention relates to deburring tools, and particularly to a deburring tool having a body of uniform diameter and a blade which is capable of cutting a burr from both faces of a sheet or plate.

A burr is usually formed on one or both faces of a workpiece when a hole is drilled, punched or otherwise formed therein or therethrough. Deburring tools have been provided heretofore in the art for cutting the protruding burr from the edge of the hole. Such deburring tools were usually made for a specific operation and had limited application because of the type of blade employed, because of the mechanism for controlling the actuation of the blade or because the body of the blade had sections of different diameters or overall dimensions.

In practicing the present invention, a deburring tool is provided of the universal type which may be employed in any length of hole and which may dress the edge of the hole at both sides of the workpiece, or which may dress the edge at either side of the workpiece. A cylindrical body of uniform diameter and of any desired length is preferably employed. A slot is provided through the body communicating with an aperture extending through one end of the body. A blade is pivoted in the slot having a cutting nib extending from one side thereof. A spring-pressed plunger is adjustably secured in the aperture in the one end of the body, in engagement with the end of the blade opposite to that having the nib, for urging the nib outwardly of the slot with sufficient force to produce cutting while permitting the blade to be moved to retract the nib within the slot. A stop projection is provided on the blade, engageable with the body, plunger or other tool part, for limiting the projection of the nib from the slot under the influence of the spring-pressed plunger. A pin is employed through the body and slot of such dimension and construction as to be locked on the body when engaging the blade after a bias is applied thereto by the plunger.

Accordingly, the main objects of the invention are: to provide a deburring tool having a body of uniform dimension for all or a substantial part of the length thereof; to provide a tool having an elongated body with a trough slot in which a blade is pivoted having a deburring nib extending from one side of the slot when the opposite end of the blade is engaged by a spring-pressed plunger; to provide a deburring tool with a blade having a nib which may have cutting edges on the front and rear edges thereof for cutting a burr on both sides of a workpiece or which may have a cutting edge for cutting only the top or bottom burr on the workpiece; and, in general, to provide a deburring tool which is simple in construction, universal in application and economical of manufacture.

Other objects and features of novelty of the invention will be specifically pointed out or will become apparent when referring, for a better understanding of the invention, to the following description taken in conjunction with the accompanying drawing, wherein:

Figure 1 is a broken, vertical section view of a deburring tool embodying features of the present invention;

Fig. 2 is a sectional view of the structure illustrated in Fig. 1, taken on the line 2—2 thereof;

Fig. 3 is a broken view of a blade, similar to that illustrated in Fig. 1, showing another form thereof;

Fig. 4 is a sectional view of the structure illustrated in Fig. 1, taken on the line 4—4 thereof;

Fig. 5 is a view of structure, similar to that illustrated in Fig. 3, showing a further form which the invention may assume, and Fig. 6 is a sectional view of the structure illustrated in Fig. 4, taken on the line 6—6 thereof.

Referring to the figures, a cylindrical body 10 has a central slot 11 cut therethrough for receiving a blade 13 disposed therein. The slot 11 communicates with a central aperture 14 extending through one end of the body. An aperture 15 extends laterally through the body 10 and an aperture 16 extends through the blade 13 of substantially the same diameter as the aperture 15. A pin 17 of a diameter to extend through the apertures 15 and 16 has a central annular groove 18 of a width to receive the blade 13. After the pin is assembled in the body and blade, as illustrated in Fig. 2, the shifting of the blade into the groove 18 locks the pin in the body against lateral displacement.

The end of the blade adjacent to the aperture 14 in the body is provided with a sloping end portion 19 and a stop projection 21. A plunger 22 is disposed within the aperture 14 having a head 23 adapted to engage the sloping end portion 19 of the blade and to be engaged by the stop projection 21 thereof. A spring 24 is disposed within the aperture in position to engage the plunger when forced thereagainst by a setscrew 25 in engagement with a thread 26 in the lower wall portion of the aperture. The tension of the spring and the bias applied to the blade may be regulated by the adjustment of setscrew 25 within the aperture 14.

The blade has a nib 27 extending from one side adjacent to the end opposite to that containing the sloping end portion 19 on the same side as that containing the stop projection 21. In Fig. 1, the nib is illustrated as having a front cutting edge 28, a rear cutting edge 29 and a central bearing portion 31 disposed therebetween. The end 32 of the body 10 opposite to that containing the aperture 14 is the driving shank of the tool by which the tool is driven in rotation. As the tool is rotated, it is advanced through an aperture 33 in a workpiece 34, and during such advancement the cutting edge 28 engages and cuts off the burr 35 at the top edge of the apertures. The tension of the spring 24 is so regulated that as the burr is being removed the nib will retract due to the slope of the cutting edge 28, which produces the counterclockwise rocking of the blade 13. Thereafter, the bearing portion 31 engages the wall of the aperture and holds the blade in retracted position until the cutting edge 29 engages the burr 36 at the lower edge of the aperture which is cut therefrom as the nib moves outwardly until the stop projection 21 engages the head 23 of the plunger 22. The degree of projection of the nib from the slot is regulated by the engagement of the head 23 and projection 21 and is adjusted by changing the dimensions thereof.

The one edge of the body 10 adjacent to the slot 11 is cut away at 37 to provide clearance for the chips produced when the blade cuts a burr from the edge of the hole. It will be noted that the cutting edges 28 and 29 are relieved at 38 in the same direction as illustrated in Figs. 1 and 4, opposite to the direction of rotation of the body 10. The side of the blade 11 opposite to that containing the nib 27 is sloped at 39 an amount to permit the retraction of the nib while the side 39 is retained within the slot. The opposite edge of the blade below the pin 17 is also sloped for the same reason.

The bearing portion 31 of the nib is of arcuate shape both longitudinally and laterally of the blade, as illustrated in Figs. 1 and 6, to prevent the scoring of the aperture wall when passing therethrough.

In Fig. 3, a nib 41 is illustrated on the blade 13 having the front cutting edge 28 thereon and the bearing portion 31 extended across the central and rear portion 42 of the nib so that only the burr 35 at the top edge of the hole is removed upon the insertion and removal of the tool.

In Fig. 4, a nib 43 is illustrated having the rear cutting edge 29 thereon and the bearing portion 31 extended across the central and front portion 44 of the nib so that only the burr 36 at the bottom edge of the hole is removed upon the insertion and removal of the tool.

What is claimed is:

1. A deburring tool including, in combination, an elongated body of substantially uniform cross section having an elongated slot therethrough disposed lengthwise of the body intermediate the ends thereof, an elongated blade disposed lengthwise in said slot, a pivot extending through said body and blade, a nib on the side of said blade at one end thereof having a cutting edge, and spring means engaging the other end of said blade toward the edge thereof opposite to the edge having the nib for urging said nib outwardly of said slot.

2. A deburring tool including, in combination, an elongated body of substantially uniform cross section having an elongated slot therethrough disposed lengthwise of the body intermediate the ends thereof, an elongated blade disposed lengthwise in said slot, a pivot extending through said body and blade, a nib on the side of said blade at one end thereof having a cutting edge, spring means engaging said blade and urging said nib outwardly of said slot, and positive stop means for limiting the extent of projection of said nib from said slot.

3. A deburring tool including, in combination, an elongated body of substantially uniform cross section having an elongated slot therethrough disposed lengthwise of the body intermediate the ends thereof, an elongated blade disposed lengthwise in said slot, a pivot extending through said body and blade, spring means for urging one end of the blade from said slot, said pivot having an annular groove in the peripheral wall of a width to receive said blade whereby the spring means retains the blade in said groove and secures the pivot in said body.

4. A deburring tool including, in combination, an elongated body of substantially uniform cross section having a longitudinally disposed slot therethrough intermediate the ends thereof, a blade extending longitudinally in said slot, a pivot extending through said body and blade, and a nib at the side of said blade at one end thereof having a front and rear cutting edge and a bearing portion therebetween, said bearing portion being of arcuate shape both lengthwise and crosswise of the blade.

5. A deburring tool including, in combination, an elongated body of substantially uniform cross section having a slot disposed lengthwise of the body intermediate the ends thereof, one end portion of said body having an aperture therethrough communicating with said slot, a blade in said slot, a pivot extending through said body and blade, a nib on the side of said blade at one end thereof having a cutting edge, the opposite end of the blade forming an inclined plane with a stop projection disposed adjacent thereto, a plunger in the aperture at one end of the body engageable with said inclined plane for rotating said blade an amount limited by said stop projection, a spring in said aperture, and a setscrew in said aperture adjustable therein for regulating the tension on said spring.

6. A deburring tool including, in combination, an elongated body of substantially uniform cross section having a slot disposed lengthwise of the body intermediate the ends thereof, one end portion of said body having an aperture therethrough communicating with said slot, a blade in said slot, a pivot extending through said body and blade, said pivot having an annular groove in the peripheral wall of a width to receive said blade, a nib on the side of said blade at one end thereof having a cutting edge, the opposite end of the blade forming an inclined plane with a stop projection disposed adjacent thereto, a plunger in the aperture at one end of the body engageable with said inclined plane for rotating said blade an amount limited by said stop projection, a spring in said aperture, and a set-screw in said aperture adjustable therein for regulating the tension on said spring.

7. In a tool for cutting a burr from the edge of a hole, an elongated body having a slot lengthwise thereof, an elongated blade in said slot, a pivot extending through said body and blade permitting the blade to rock within said slot, a nib extending from one side of the blade retractable substantially within said slot, said nib having a sloping cutting edge, and spring means engaging said blade and urging said nib from said slot while permitting it to retract against the pressure of said spring means.

8. A blade for a cutting tool having a flat elongated body with an aperture therethrough, the side edges of said blade converging from said aperture toward the ends, a nib having a cutting edge extending from a side of the blade near one end thereof, and a stop projection on the opposite end of said blade adjacent to a sloping surface provided thereon.

9. A blade for a cutting tool having a flat elongated body with an aperture therethrough, the side edges of said blade converging from said aperture toward the ends, a nib having a cutting edge exending from a side of the blade near one end thereof, and a stop projection on the opposite end of said blade, said last said end sloping to provide an inclined plane located adjacent to said stop projection.

10. A blade for a cutting tool having a flat elongated body with an aperture therethrough interjacent the ends, a nib having a cutting edge extending from one side of said blade near one end thereof, and means on the opposite end of the blade between the sides thereof which causes the blade to pivot when pressure is applied thereto.

11. A blade for a cutting tool having a flat elongated body with an aperture therethrough interjacent the ends, a nib having a cutting edge extending from one side of said blade near one end thereof, means on the opposite end of the blade between the sides thereof which causes the blade to pivot when pressure is applied thereto, and means on said blade which limits the pivotal movement of said blade.

STUART A. COGSDILL.

REFERENCES CITED

The following references are of record in the file of this patent:

UNITED STATES PATENTS

| Number | Name | Date |
|---|---|---|
| 745,101 | Gates | Nov. 24, 1903 |
| 1,761,804 | Snyder | June 3, 1930 |
| 1,980,178 | Bergland | Nov. 13, 1934 |
| 2,314,084 | Fried | Mar. 16, 1943 |
| 2,364,293 | Hotchner | Dec. 5, 1944 |
| 2,437,822 | Jones | Mar. 16, 1948 |

FOREIGN PATENTS

| Number | Country | Date |
|---|---|---|
| 2,748 | Great Britain | Feb. 2, 1912 |